United States Patent
Hu et al.

(10) Patent No.: US 7,929,134 B2
(45) Date of Patent: Apr. 19, 2011

(54) EVEN FREQUENCY SPACING SPECTROMETER AND OPTICAL COHERENCE TOMOGRAPHY DEVICE

(75) Inventors: Zhilin Hu, Solon, OH (US); Andrew M. Rollins, Highland Heights, OH (US)

(73) Assignee: Case Western Reserve University, Cleveland, OH (US)

( * ) Notice: Subject to any disclaimer, the term of this patent is extended or adjusted under 35 U.S.C. 154(b) by 234 days.

(21) Appl. No.: 12/154,859

(22) Filed: May 27, 2008

(65) Prior Publication Data

US 2009/0040521 A1 Feb. 12, 2009

Related U.S. Application Data

(60) Provisional application No. 60/940,087, filed on May 25, 2007.

(51) Int. Cl.
*G01J 3/28* (2006.01)

(52) U.S. Cl. .................... 356/328; 250/351; 250/339.02; 250/461.2; 356/326; 356/432; 356/305

(58) Field of Classification Search .......... 356/326–328, 356/73.1, 432, 28.5, 305; 250/351, 339.02, 250/461.2
See application file for complete search history.

(56) References Cited

U.S. PATENT DOCUMENTS

| | | | | |
|---|---|---|---|---|
| 6,002,480 A | * | 12/1999 | Izatt et al. | 356/479 |
| 7,355,716 B2 | * | 4/2008 | de Boer et al. | 356/479 |
| 7,440,107 B2 | * | 10/2008 | Pasternak | 356/451 |

* cited by examiner

*Primary Examiner* — Gregory J Toatley
*Assistant Examiner* — Iyabo S Alli

(57) ABSTRACT

This application describes a spectrometer that includes a set of collimating optics to collimate received EMR to produce a collimated EMR. The spectrometer also includes a first dispersive optical element for dispersing the collimated EMR and a second dispersive optical element spaced apart from the first dispersive optical element to produce further dispersed EMR. The first dispersive optical element and the second dispersive optical element cooperate to disperse received EMR into a plurality of even frequency spaced EMR spectra. The spectrometer also includes a detector positioned to receive the EMR after passing though an optical path that includes the set of collimating optics, the first dispersive optical element, the second dispersive optical element, and a set of focusing optics.

25 Claims, 6 Drawing Sheets

EVEN FREQUENCY SPACING SPECTROMETER AND OPTICAL COHERENCE TOMOGRAPHY DEVICE

CROSS REFERENCE TO RELATED APPLICATIONS

This application claims the benefit of U.S. Provisional Application 60/940,087 filed May 25, 2007.

FEDERAL FUNDING NOTICE

The invention was developed with federal funding supplied under Federal Grants No. R01 CA114276 and R03 EB004044 provided by the NIH. The Federal Government has certain rights in the invention.

COPYRIGHT NOTICE

A portion of the disclosure of this patent document contains material subject to copyright protection. The copyright owner has no objection to the facsimile reproduction of the patent document or the patent disclosure as it appears in the Patent and Trademark Office patent file or records, but otherwise reserves all copyright rights whatsoever.

BACKGROUND

Dispersive optical elements disperse light by deviating the path of light passing through them by an amount that varies with wavelength. Prisms and gratings are two types of dispersive optical elements. Prisms disperse light because their geometry causes light of different wavelengths passing through them to be separated and deviated by different amounts. In diffraction gratings, light passing through the grating is diffracted into a series of orders caused by the interference of wavefronts emitted from each slit in the grating.

Dispersive optical elements are used in spectrometers. Spectrometers are used in fields including medicine, material sciences, chemistry, environmental sciences, and so on. Spectrometers use dispersive optical elements including gratings and/or prisms to facilitate analyzing the spectral composition of sampled light.

FIG. 1 illustrates an example conventional spectrometer 10. The spectrometer 10 includes a light entrance element 12 for receiving light from an external source. More generally the light entrance element 12 is referred to as an electromagnetic radiation entrance. The light is passed through a first set of collimating optics 14 to a diffraction grating 16. The diffraction grating 16 separates the light into various spectra. The separated light passes through a second set of focusing optics 18 to a detection element 20.

BRIEF DESCRIPTION OF DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
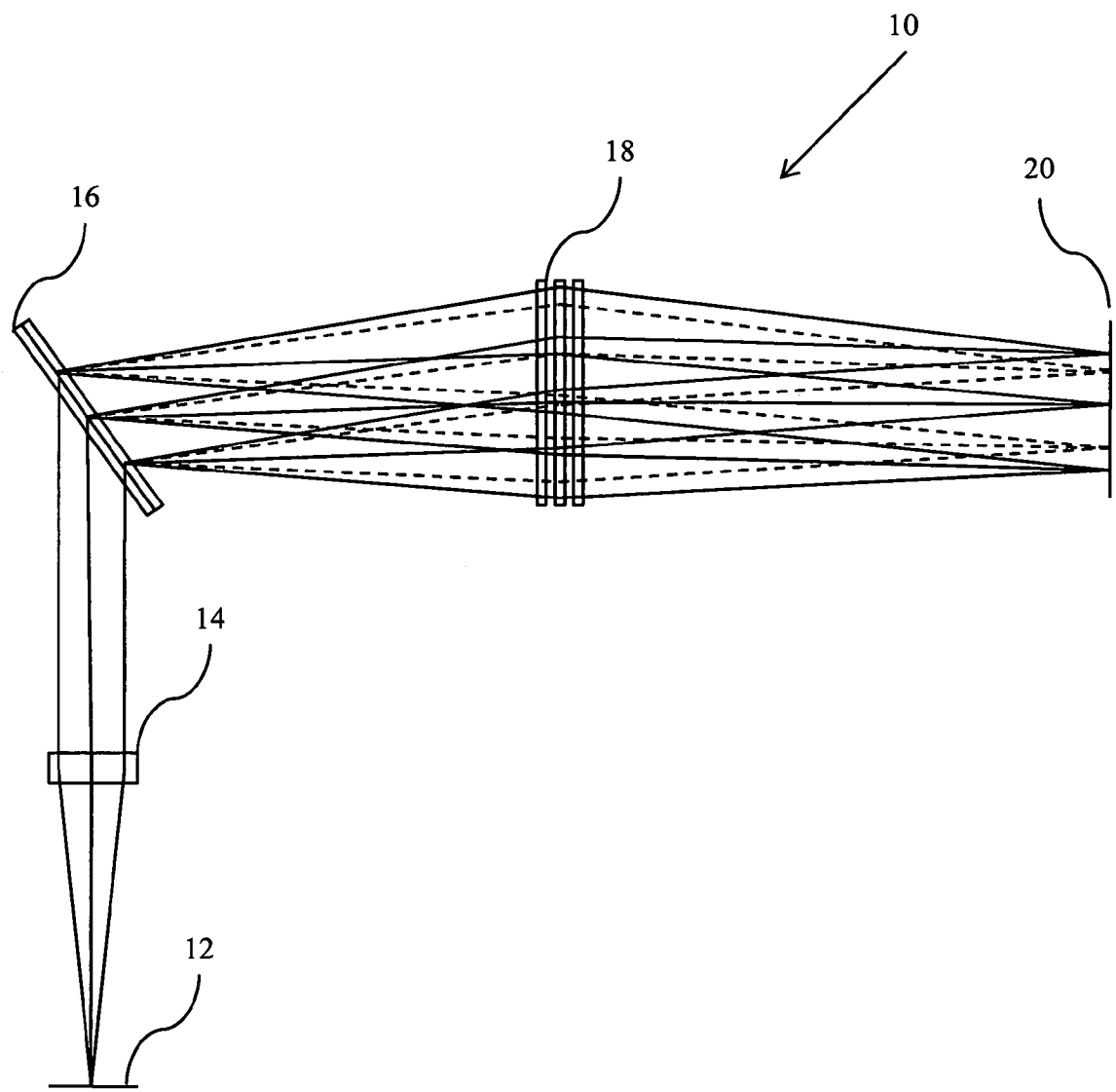
FIG. 1 illustrates a conventional spectrometer.

One example system includes a spectrometer that includes a light receiving element and a first dispersive optical element positioned to receive light from the light receiving element. While light is described, more generally the light receiving element may be described as an electromagnetic radiation receiving element. The first dispersive optical element disperses the light. The example system also includes a second dispersive optical element that is spaced apart from the first dispersive optical element. The second dispersive optical element is positioned to receive light from the first dispersive optical element and cooperates with the first dispersal element to disperse received light into a plurality of even frequency spaced light spectra.

Examples systems facilitate generating and using light having an even frequency spacing. The generating includes receiving light, passing the received light through a first dispersive optical element and a second dispersive optical element spaced apart from the first dispersive element. The first and second dispersive optical elements cooperate to disperse the received light into a plurality of even frequency spaced light spectra. This light may be used in a spectrometer, a spectral interferometer, a Fourier-domain optical coherence tomography (FDOCT) device, and so on.

In one example, a spectral interferometer may include a broad spectrum light source and a beam splitter that directs light to both a sample arm and to a reference arm. The spectral interferometer may receive light from the sample arm and the reference arm. The spectral interferometer may also include an even frequency spacing spectrometer to receive light through the beam splitter from both the reference arm and the sample arm. The spectral interferometer may be part of an interferometer system. The interferometer system may be used to image a sample at a sample location. To facilitate imaging, the interferometer system may include an optical radiation source and a fiber coupler to direct light to the sample arm and to the reference arm.

In one example, an even frequency spacing spectrometer may be part of a Fourier-domain optical coherence tomography (FDOCT) device. The FDOCT device may include a source of electromagnetic radiation, beam splitter and so on, similar to other example devices. Thus, the FDOCT device may include a first dispersive optical element positioned to receive light from the beam splitter and a second dispersive optical element spaced apart from the first dispersive optical element, where the second dispersive optical element is positioned to receive light from the first dispersive optical element. Recall that the first and second dispersive optical elements cooperate to disperse received light into a plurality of even frequency spaced light spectra. While light is described, more generally electromagnetic radiation may be processed.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Software", as used herein, includes but is not limited to, one or more executable instruction that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

Figure 2:
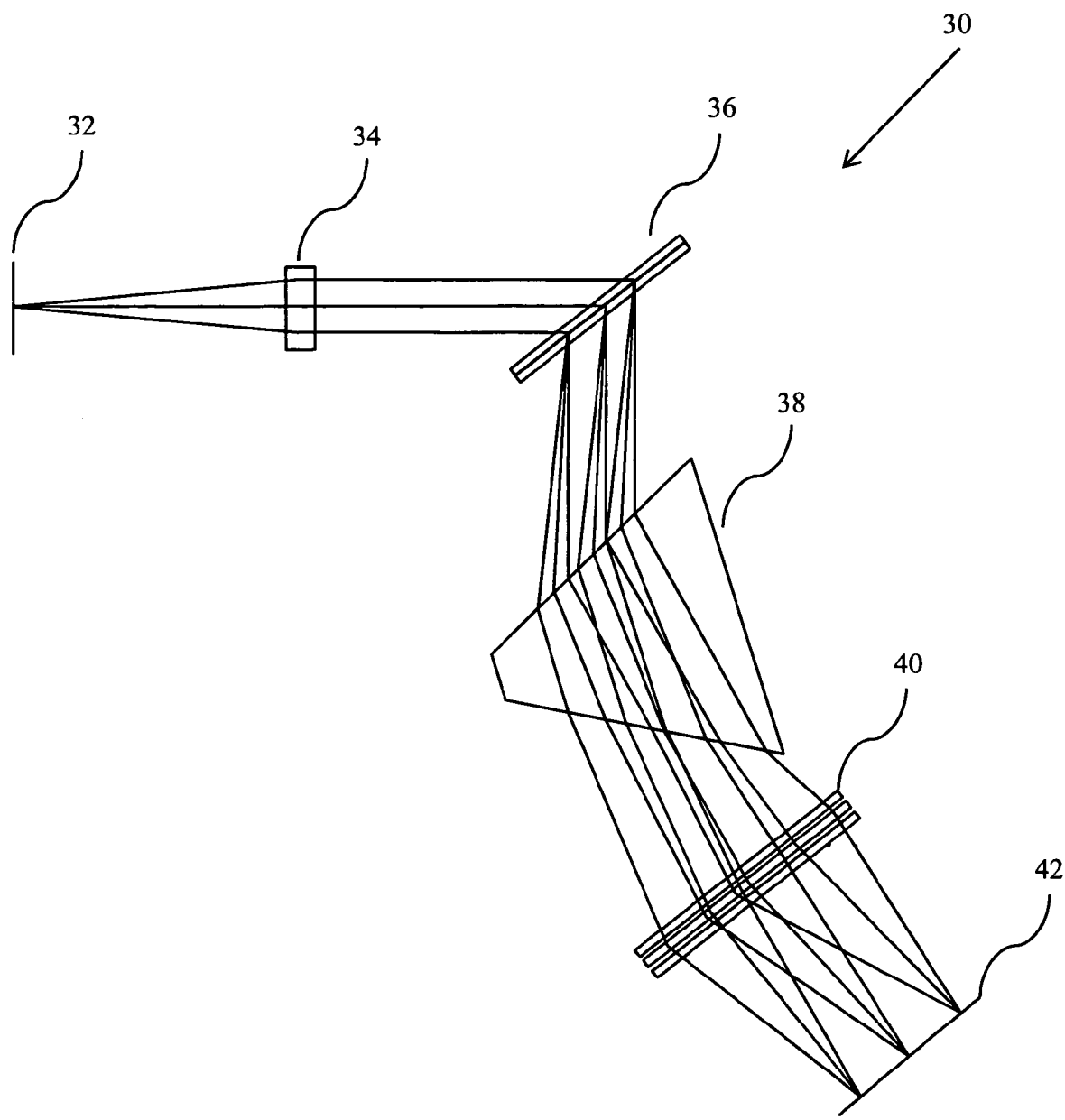
FIG. 2 illustrates an even frequency spacing spectrometer.

FIG. 2 illustrates elements of an even frequency spacing spectrometer 30. The even frequency spacing spectrometer 30 includes a first dispersive optical element 36 and a second dispersive optical element 38. The first dispersive optical element 36 and second dispersive optical element 38 are separately positioned and cooperate to provide even frequency spacing.

A spectrometer is an optical spectrum analyzer. Spectrometers are used in the field of optics and photonics. A spectrometer includes an optical wavelength dispersive component (e.g., diffractive grating). More generally, a spectrometer includes an EMR dispersive component. A diffractive grating disperses the wavelength according to the grating equation:

$$\mu\lambda = \sin(\theta_{diffracted}) + \sin(\theta_{incident}) \quad (1)$$

where:

$\mu$ is the order number, $\lambda$ is the wavelength of the received EMR (light), $\theta_{incident}$ is the angle of incidence of the received EMR, and $\theta_{diffracted}$ is the diffracted angle.

The blazing angle is the angle where the incident angle equals the diffracted angle at center wavelength. When the incident angle is the blazing angle, equation (1) becomes:

$$\mu\lambda = \sin(\theta_{diffracted}) + 0.5\mu\lambda_{centerwavelength} \quad (2)$$

Equation (2) provides the differentiation of the diffracted angle as function of wavelength $\lambda$ with an even wavelength spacing $\delta\lambda$ or wave number k with an even wave number spacing $\delta k$. These are shown in equations (3) and (4).

$$\delta\theta = \frac{\delta\lambda}{\sqrt{\frac{1}{\mu^2} - (\lambda - 0.5\lambda_{centerwavelength})^2}} \quad (3)$$

$$\delta\theta = \frac{\delta k}{k\sqrt{\frac{k^2}{4\pi^2\mu^2} - \left(1 - 0.5k\frac{k}{k_{centerwavenumber}}\right)^2}} \quad (4)$$

Figure 3:
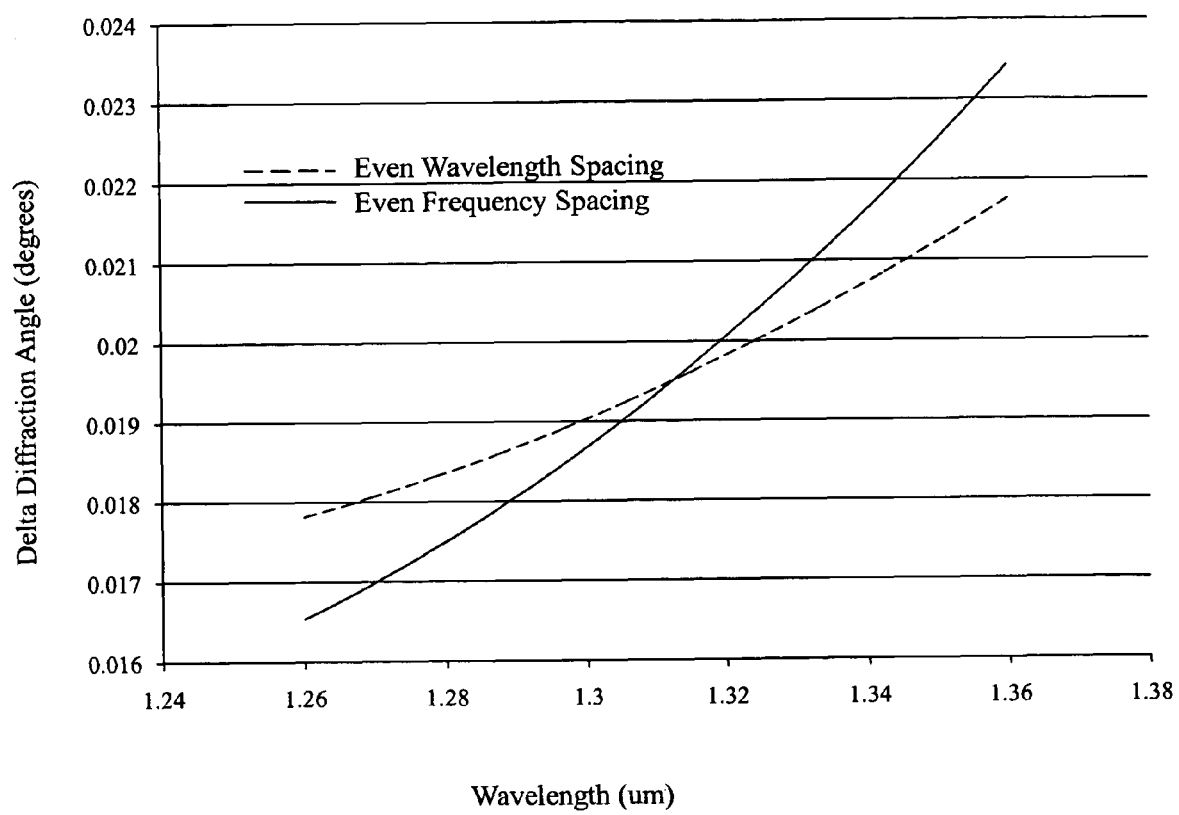
FIG. 3 plots the change in diffraction angle as a function of wavelength with even frequency spacing and even wavelength spacing.
Figure 4:
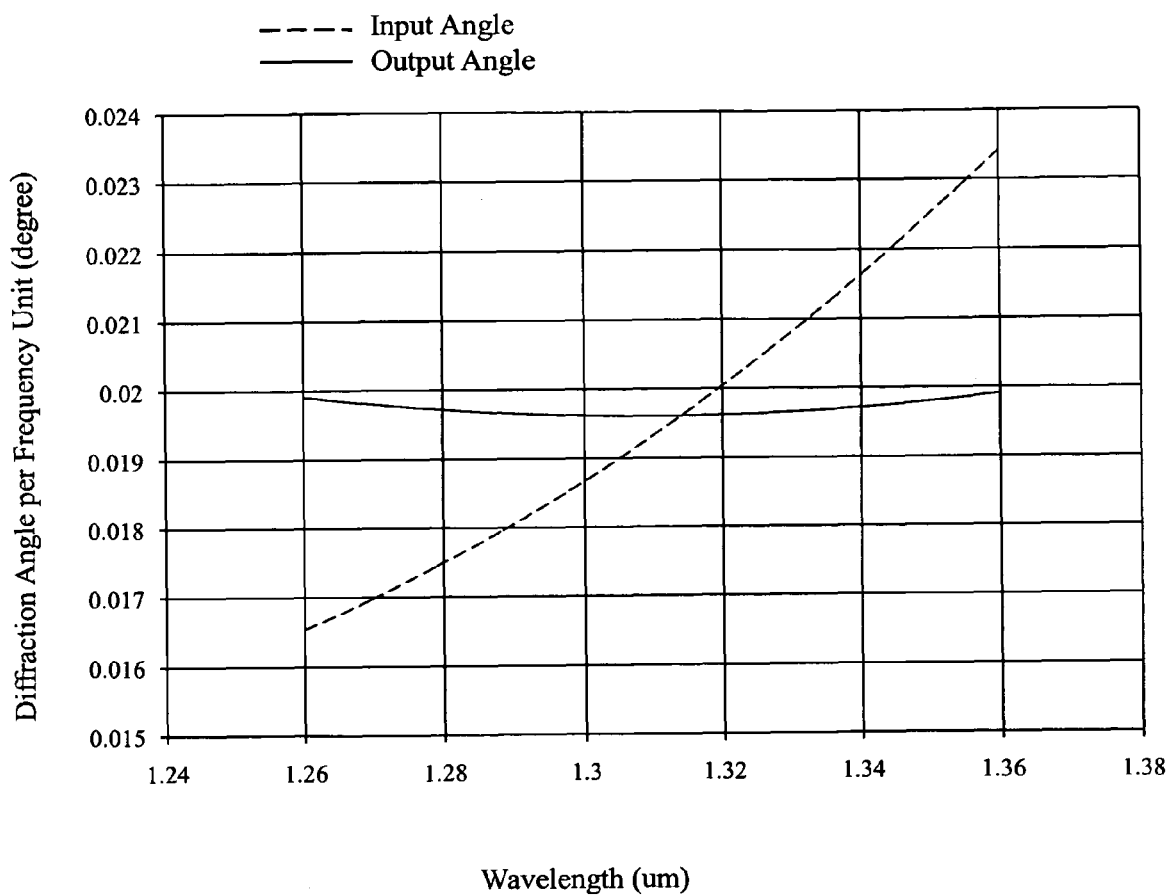
FIG. 4 plots the diffraction angle per frequency unit as a function of wavelength comparing incident angle and refraction angle for an example prism in an example even frequency spacing spectrometer.

FIG. 1 illustrates the layout of a conventional diffractive grating 16 and charge coupled device (CCD) camera 20 based spectrometer system 10. In system 10, light is received at receiving element 12 and collimated by collimators 14 before the grating 16, which diffracts the collimated beam in wavelength. The diffracted beam is then focused by the objective 18 onto a CCD array 20 to form the spectrum of the light source. Equations (3) and (4) show that the diffraction angle has different relations with wavelength $\lambda$ if the $\delta\lambda$ is kept constant and that the diffraction angle has different relations with wave number k if the $\delta k$ is kept constant. FIGS. 3 and 4 illustrate that longer wavelengths have larger diffraction angles and that the diffraction angle at even frequency spacing increases with respect to the increment of the wavelength faster than at even wavelength spacing. Thus, to cover the same number of pixels of a CCD camera, the longer wavelengths require a narrower bandwidth than the shorter wavelengths. This may make if difficult, if possible at all, to obtain a spectrum read out in even wavelength or wave number spacing example.

An optical switch in optical communication requires even wavelength spacing to separate the channels. Additionally, the Fast-Fourier-Transformation requires even wave number spacing to simplify the Fourier-domain optical coherence tomography (FDOCT) to get high data acquisition speed. Therefore, FIG. 2 illustrates an even frequency spacing spectrometer 30. The spectrometer 30 includes a light receiving element 32. In one example, the light receiving element 32 is an entrance slit of a fiber optic input port. The light receiving element 32 may, more generally receive electromagnetic radiation. The light may be passed through a first set of collimating optics 34. The collimating optics 34 may be, for example, lenses or collimators. The collimating optics 34 collimate the received light and provide collimated light to a first dispersive optical element 36 and to a second dispersive optical element 38. The first dispersive element 36 and the second dispersive element 38 are positioned and configured to provide even frequency spacing of the collimated light. The even frequency spaced light may be passed through a set of focusing optics 40 for detection by a detector 42. The detector 42 may be, for example, a CCD camera or other array detector.

In one embodiment, the second dispersive optical element 38 is spaced apart from the first dispersive optical element 36 to facilitate dispersing the collimated light into even frequency spaced light. The first dispersive optical element 36 and the second dispersive optical element 38 may be different apparatus. In one example, the first dispersive optical element 36 is a diffraction grating and the second dispersive optical element 38 is a prism. In one example, the diffraction grating and the prism are positioned and configured to provide light output having an even frequency spacing. In another example, the first dispersive optical element 36 and the second dispersive optical element 38 may be spaced to produce an even wave number spacing and/or an even wavelength spacing.

FIG. 2 illustrates an even frequency spacing spectrometer 30 with the first dispersive optical element 36 (e.g., diffraction grating) positioned before the second dispersive optical element 38 (e.g., prism) in the light path extending from the light receiving element 32 to the detector 42. One skilled in the art will be appreciated that the second dispersive element 38 may be positioned at different locations in the light path. For example, the second dispersive optical element 38 may be positioned before the first dispersive optical element 36. The second dispersive optical element 38 may also be positioned at any location in the spectrometer optical path that still produces even frequency spacing and/or even wave number spacing. The even frequency spacing spectrometer 30 may have as its second dispersive optical element 38 apparatus including doped and patterned glass, an ultrasonic module, a liquid crystal, and so on.

Even frequency spacing spectrometer 30 provides superior results over conventional spectrometer 10. Similarly, an even wavelength spacing spectrometer also provides superior results over conventional spectrometer 10. FIG. 3 illustrates a comparison of diffraction angles at even frequency and even wavelength spacing. According to the Neil's refraction law, the refraction (or output) angle after a prism acting as a dispersive optical element prism is expressed by the equation (5).

$$\theta_{output} = \sin^{-1}\left(\sin(2\alpha) \cdot \sqrt{n^2 - \sin(\theta_{input})^2} + \sin(\theta_{input}) \cdot \cos(2\alpha)\right) \quad (5)$$

$\theta_{input}$ is defined by equation 6.

$$\theta_{input} = \sin^{-1}(n(\lambda_{center}) \cdot \cos(\alpha)) + \sin^{-1}(\mu\lambda - 0.5 \cdot \mu \cdot \lambda_{center}) - \sin^{-1}(0.5 \cdot \mu \cdot \lambda_{center}) \quad (6)$$

In equations 5 and 6, α is the bottom angle of the prism. A reference incident angle is defined where the refraction angle is the compensation of the bottom angle for the beam at the center wavelength of the spectrum. This implies that a ray trace of the center wavelength will be parallel to the bottom of the prism. This example design minimizes the ellipticity of the output beam over all the spectrum. Parameter μ is the number of grooves per micrometer of the grating. In Equation 5, the refractive index is the function of wavelength but in equation 6 the index n is only the value of the center wavelength.

FIG. 4 illustrates a comparison of the refraction and the incident angles at even frequency spacing as a function of wavelength. FIG. 4 illustrates that the refraction angle is significantly equalized after passing through an optimum designed prism. Further improvement of an equalized frequency distribution on a CCD camera is obtained by inserting an objective lens in the light path after a second dispersive optical element (e.g., prism).

Figure 5:
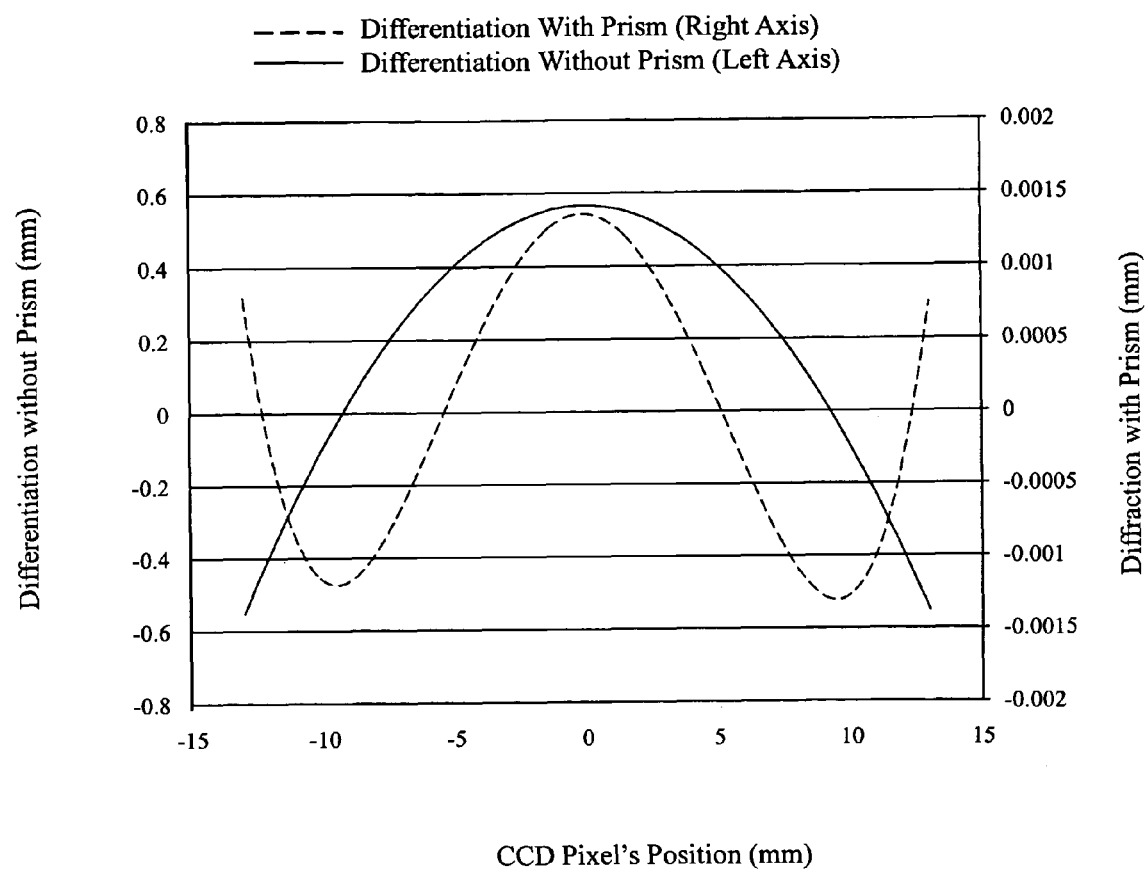
FIG. 5 plots a differentiation between wave number and pixel position for a spectrometer with and without a prism.

FIG. 5 illustrates a mismatch between the locations of an $i^{th}$ wave number and an $i^{th}$ pixel. In one example, a CCD camera pixel is 50 micrometers in size. Without the second dispersive optical element cooperating with the first dispersive optical element in the example spectrometers, the maximum mismatch is about 550 micrometers. This corresponds to the distance of 11 pixels of the example CCD camera. With the second dispersive optical element (e.g., prism) positioned and configured to cooperate with the first dispersive optical element to produce even frequency spacing, the mismatch is reduced to only 1.4 micrometers. This is the distance of only 0.028 pixels in the example camera. Thus, FIG. 5 illustrates how selecting and positioning the second dispersive optical element (e.g., prism) produces unexpected and superior results, yielding a reduction in maximum mismatch between the frequency and pixel by about 400 times.

An even frequency spacing spectrometer may be employed in a variety of optical devices. In one example, an even frequency spacing spectrometer may be included in a Fourier-domain optical coherence tomography (FDOCT) device. FDOCT is a different form of low-coherence interferometry. In FDOCT, the reference delay is fixed except for potential wavelength-scale delay modulation. In FDOCT the information about the location and amplitude of scatterers in the sample is derived from the optical spectrum of the light returning from the sample and mixing with the reference. This spectral information may be acquired by spectrally dispersing the detector arm light using a spectrometer and detecting it with an array detector (e.g., CCD).

Figure 6:
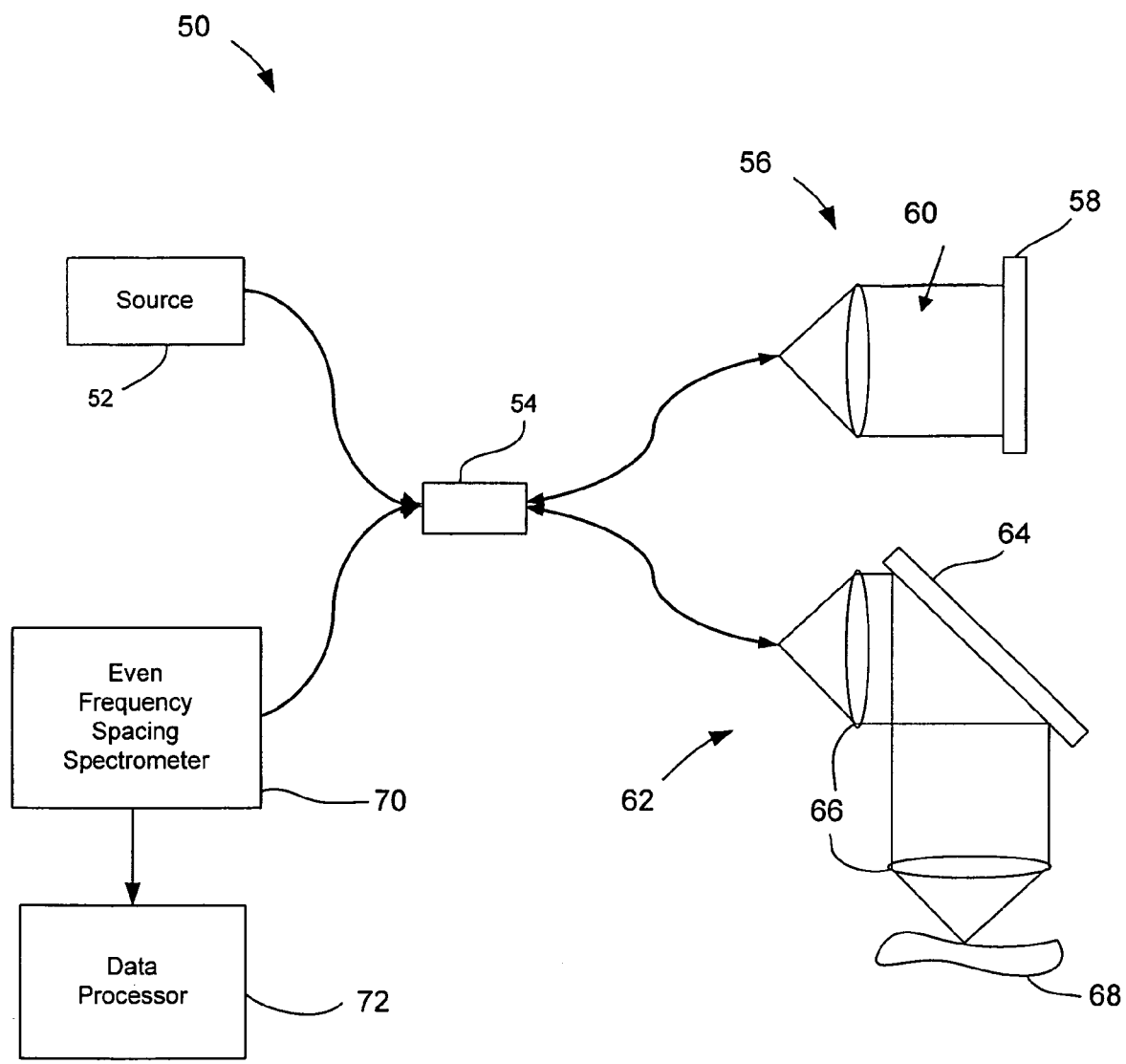
FIG. 6 illustrates a Fourier Domain optical coherence tomography (FD-OCT) device employing an even frequency spacing spectrometer.

FIG. 6 illustrates an example even frequency spacing spectrometer 70 incorporated into a Fourier-domain optical coherence tomography (FDOCT) device 50. The FDOCT device 50 may include a source of electromagnetic radiation 52. The source 52 may be, for example, a broad spectrum or low coherence laser source. The source 52 may be coupled or otherwise be in optical communication with a beam splitter 54. The beam splitter 54 may be, for example, a fiber coupler. The beam splitter 54 directs light from the source 52 to a reference arm 56 and to a sample arm 62. The reference arm 56 may be, for example, a mirror 58 with appropriate focusing optics 60. The sample arm 62 may include a mirror 64 and appropriate focusing optics 66 to image a sample 68.

Light reflected from the sample arm 62 and the reference arm 56 is combined by the beam splitter 54 and routed to an even frequency spacing spectrometer 70. In different examples, the even frequency spacing spectrometer 70 may be configured according to the various embodiments described above. For example, the even frequency spacing spectrometer 70 may include a first dispersive optical element, (e.g., diffraction grating) and a second dispersive optical element (e.g., prism) that is separated from the first dispersive optical element and cooperates with the first dispersive optical element to provide even frequency spacing separation of the combined sample and reference arm light for detection by a detector (e.g., CCD camera array detector). The detected light may undergo suitable image processing using data processor 72. Data processor 72 may generate an OCT image for display on a human-readable display.

It will be appreciated that an even frequency spacing spectrometer may be employed in connection with a variety of device in which dispersion of light into even frequency spaced spectra is valuable. Such examples include the above-described spectral interferometric devices as well as optical switching devices and wave division multiplexing (WDM) devices. The WDM devices may include, for example, even frequency spacing and even wavelength spacing spectral subsystems for optical switches and add/drop devices.

In one example, a spectrometer 20 includes an electromagnetic radiation (EMR) receiving element 32 to receive EMR from a source. The EMR receiving element may be, for example, an entrance slit of a fiber optic input port for receiving electromagnetic radiation.

The spectrometer 20 includes a set of collimating optics 34 to collimate the EMR received from the receiving element 32 to produce a collimated EMR. The set of collimating optics may include, for example, a single lens, a plurality of lenses, and/or collimators.

The spectrometer 20 also includes a first dispersive optical element 36 for dispersing the collimated EMR. The first dispersive optical element is positioned to receive the collimated EMR from the receiving element 32 via the collimating optics 34.

The spectrometer 20 also includes a second dispersive optical element 38. The second dispersive optical element 38 is spaced apart from the first dispersive optical element 36 to produce further dispersed EMR. The first dispersive optical element 36 and the second dispersive optical element 38 cooperate to disperse received EMR into a plurality of even frequency spaced EMR spectra. In one example, the first dispersive optical element 36 and the second dispersive optical element 38 are different types of dispersive optical elements. In one example, the first dispersive optical element is a diffraction grating and the second dispersive optical element is a prism.

The spectrometer 20 also includes a set of focusing optics 40 for focusing the dispersed EMR received from the first dispersive optical element 36. The spectrometer 20 also includes a detector 42 positioned to receive the ENR after passing though an optical path that includes the receiving element 32, the set of collimating optics 34, the first dispersive optical element 36, the second dispersive optical element 38, and the set of focusing optics 40. In other examples, the first dispersive optical element 36 and the second dispersive optical element 38 cooperate to output EMR having an even frequency spacing, an even wave number spacing, and/or an even wavelength spacing. The second dispersive optical element 38 may be positioned at different locations including, for example, between the receiving element 32 and the set of collimating optics 34, between the set of collimating optics 34 and the first dispersive optical element 36, between the first dispersive optical element 36 and the set of focusing optics 40, and between the set of focusing optics 40 and the detector 42. The detector 42 may be, for example, a charge coupled device (CCD) camera configured to record EMR in the wavelength range of 1.26 µm to 1.36 µm.

The spectrometer 20 may be incorporated into different devices. For example, the spectrometer 20 may receive EMR as part of an optical switching system, as part of a wave division multiplexing system, as part of a spectral interferometer device, as part of an interferometer device, as part of an optical coherence tomography (OCT) device, and so on.

Spectrometer 20 may be controlled to perform a method. In one example, the various elements of spectrometer 20 may be dynamically reconfigurable under software control. Thus, the method may include receiving electromagnetic radiation (EMR) and controlling an element of spectrometer 20 to pass the received EMR through a set of collimating optics 34 to produce collimated EMR. The method may also include controlling an element of spectrometer 20 to pass the collimated EMR through a first dispersive optical element 36 to produce dispersed EMR. The method may also include controlling an element of spectrometer 20 to pass the dispersed EMR through a second dispersive optical element 38 spaced apart from the first dispersive element 36 to produce further dispersed EMR. Recall that the first dispersive optical element 36 and the second dispersive optical element 38 may be different types of dispersive optical elements and that they cooperate to disperse received EMR into a spectra having an even frequency spacing, an even wave number spacing, and/or an even wavelength spacing.

In one example, spectrometer 30 may be part of a Fourier-domain optical coherence tomography (FDOCT) system 50 (e.g., spectrometer 70). The system 50 may also include a source 52 of electromagnetic radiation (EMR). The source 52 of electromagnetic radiation may be, for example, a broad spectrum laser source, a coherence laser source, and so on. The system 50 may also include a beam splitter 54 to direct EMR provided by the source 52 of EMR to a sample arm 56 and to a reference arm 62. The beam splitter 54 may also receive EMR from the sample arm 56 and the reference arm 62. The beam splitter 54 may be, for example, is a fiber coupler.

The even frequency spacing spectrometer 70 receives EMR comprising EMR combined by the beam splitter 54 from EMR received from the sample arm 62 and EMR received from the reference arm 56. Receiving EMR from the sample arm 62 and the reference arm 56 includes combining the EMR from the reference arm 56 and the sample arm 62.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Gamer, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, ABC, AAA, AAB, AABB, AABBC, AABBCC, and so on (e.g., the data store may store only A, only B, only C, A&B, A&C, B&C, A&B&C, A&A&A, A&A&B, A&A&B&B, A&A&B&B&C, A&A&B&B&C&C, and so on). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A spectrometer, comprising:
    an electromagnetic radiation (EMR) receiving element to receive EMR from a source;
    a set of collimating optics to collimate the EMR received from the receiving element to produce a collimated EMR;
    a first dispersive optical element for dispersing the collimated EMR, the first dispersive optical element being positioned to receive the collimated EMR from the receiving element via the collimating optics;
    a second dispersive optical element spaced apart from the first dispersive optical element to produce further dispersed EMR, where the first dispersive optical element and the second dispersive optical element cooperate to disperse received EMR into a plurality of even frequency spaced EMR spectra; and
    a set of focusing optics for focusing the dispersed EMR received from the second dispersive optical element; and
    a detector positioned to receive the EMR after passing though an optical path that includes the receiving element, the set of collimating optics, the first dispersive optical element, the second dispersive optical element, and the set of focusing optics.

2. The spectrometer of claim 1, where the first dispersive optical element and the second dispersive optical element are different types of dispersive optical elements.

3. The spectrometer of claim 2, where the first dispersive optical element is a diffraction grating.

4. The spectrometer of claim 3, where the second dispersive optical element is a prism.

5. The spectrometer of claim 2, where the second dispersive optical element is one of, a prism, a doped and patterned glass, an ultrasonic optical module, and a liquid crystal.

6. The spectrometer of claim 1, where the first dispersive optical element and the second dispersive optical element cooperate to output EMR having one of, an even frequency spacing, an even wave number spacing, and an even wavelength spacing.

7. The spectrometer of claim 1, where the first dispersive optical element and the second dispersive optical element cooperate to output EMR having an even frequency spacing, an even wave number spacing, and an even wavelength spacing.

8. The spectrometer of claim 1, where the second dispersive optical element is positioned between the receiving element and the set of collimating optics.

9. The spectrometer of claim 1, where the second dispersive optical element is positioned between the set of collimating optics and the first dispersive optical element.

10. The spectrometer of claim 1, where the second dispersive optical element is positioned between the first dispersive optical element and the set of focusing optics.

11. The spectrometer of claim 1, where the second dispersive optical element is positioned between the set of focusing optics and the detector.

12. The spectrometer of claim 1, where the EMR receiving element is an entrance slit or a fiber optic input port for receiving electromagnetic radiation.

13. The spectrometer of claim 1, where the set of collimating optics include one or more of, a single lens, a plurality of lenses, and collimators.

14. The spectrometer of claim 1, where the detector is a charge coupled device (CCD) camera.

15. The spectrometer of claim 1, where the EMR wavelength is in the range of 1.26 μm to 1.36 μm.

16. The spectrometer of claim 1, where the spectrometer receives EMR as part of an optical switching system.

17. The spectrometer of claim 1, where the spectrometer receives EMR as part of a wave division multiplexing system.

18. The spectrometer of claim 1, where the spectrometer receives EMR as part of a spectral interferometer device.

19. The spectrometer of claim 1, where the spectrometer receives EMR as part of an interferometer device.

20. The spectrometer of claim 1, where the spectrometer receives EMR as part of an optical coherence tomography (OCT) device.

21. A method, comprising:
receiving electromagnetic radiation (EMR);
controlling an even frequency spacing spectrometer to pass the received EMR through a set of collimating optics to produce collimated EMR;
controlling an even frequency spacing spectrometer to pass the collimated EMR through a first dispersive optical element to produce dispersed EMR; and
controlling an even frequency spacing spectrometer to pass the dispersed EMR through a second dispersive optical element spaced apart from the first dispersive element to produce further dispersed EMR;
where the first dispersive optical element and the second dispersive optical element are different types of dispersive optical elements; and
where the first dispersive optical element and second dispersive optical element cooperate to disperse received EMR into a spectra having one of an even frequency spacing, an even wave number spacing, and an even wavelength spacing.

22. The method of claim 21, where the first dispersive optical element is a diffraction grating and the second dispersive optical element is one of, a prism, a doped and patterned glass, an ultrasonic optical module, and a liquid crystal.

23. A Fourier-domain optical coherence tomography (FDOCT) system, comprising:
a source of electromagnetic radiation (EMR);
a beam splitter configured to direct EMR provided by the source of EMR to a sample arm and to a reference arm and to receive EMR from the sample arm and the reference arm; and
an even frequency spacing spectrometer for receiving EMR comprising EMR combined by the beam splitter from EMR received from the sample arm and EMR received from the reference arm;
the even frequency spacing spectrometer comprising:
an EMR receiving element to receive EMR from the beam splitter;
a set of collimating optics to collimate the EMR received from the receiving element into a collimated EMR;
a first dispersive optical element positioned to receive the collimated EMR from the receiving element via the set of collimating optics and to disperse the collimated EMR into a dispersed EMR;
a second dispersive optical element spaced apart from the first dispersive optical element, the second dispersive optical element being positioned to receive dispersed EMR from the first dispersive optical element and to produce further dispersed EMR;
a set of focusing optics for focusing the further dispersed EMR received from the second dispersive optical element into focused EMR; and
a detector positioned to receive the focused EMR focused by the set of focusing optics;
where the first dispersive optical element and second dispersive optical element cooperate to produce further dispersed EMR having even frequency spacing; and
where the first dispersive optical element is a diffraction grating and the second dispersive optical element is one of, a prism, a doped and patterned glass, an ultrasonic optical module, and a liquid crystal;
where receiving EMR from the sample arm and the reference arm includes combining the EMR from the reference arm and the sample arm.

24. The system of claim 23, where the source of electromagnetic radiation is one of, a broad spectrum laser source, and a coherence laser source.

25. The system of claim 23, where the beam splitter is a fiber coupler.

* * * * *

UNITED STATES PATENT AND TRADEMARK OFFICE
CERTIFICATE OF CORRECTION

| | | |
|---|---|---|
| PATENT NO. | : 7,929,134 B2 | Page 1 of 1 |
| APPLICATION NO. | : 12/154859 | |
| DATED | : April 19, 2011 | |
| INVENTOR(S) | : Hu et al. | |

It is certified that error appears in the above-identified patent and that said Letters Patent is hereby corrected as shown below:

Specification:

In column 6, line 37, delete "device" and insert --devices--.

In column 7, line 60, delete "is".

In column 8, lines 24, delete "Gamer" and insert --Garner--.

Signed and Sealed this
Twenty-eighth Day of June, 2011

David J. Kappos
*Director of the United States Patent and Trademark Office*